(12) United States Patent
Atta et al.

(10) Patent No.: US 9,430,240 B1
(45) Date of Patent: Aug. 30, 2016

(54) PRE-COMPUTATION SLICE MERGING FOR PREFETCHING IN A COMPUTER PROCESSOR

(71) Applicant: International Business Machines Corporation, Armonk, NY (US)

(72) Inventors: Islam Atta, Toronto (CA); Ioana M. Baldini Soares, Irvington, NY (US); Kailash Gopalakrishnan, San Jose, CA (US); Vijayalakshmi Srinivasan, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/964,740

(22) Filed: Dec. 10, 2015

(51) Int. Cl.
  *G06F 9/38* (2006.01)
  *G06F 9/30* (2006.01)
(52) U.S. Cl.
  CPC ......... *G06F 9/3802* (2013.01); *G06F 9/30058* (2013.01)
(58) Field of Classification Search
  None
  See application file for complete search history.

(56) References Cited

U.S. PATENT DOCUMENTS

| | | | |
|---|---|---|---|
| 8,046,752 B2 | 10/2011 | Chilimbi et al. | |
| 8,505,001 B2 | 8/2013 | Upton | |
| 8,762,968 B2 | 6/2014 | Chen et al. | |
| 2002/0144083 A1* | 10/2002 | Wang | G06F 9/30072 712/23 |
| 2006/0020775 A1* | 1/2006 | Madriles | G06F 9/3012 712/235 |
| 2010/0269102 A1* | 10/2010 | Latorre | G06F 9/3842 717/130 |

OTHER PUBLICATIONS

D. Yeung, "Compiler Support for Speculative Precomputation," SpecPrec Tutorial, PACT, Sep. 27, 2003, pp. 1-36.
M. Shafique, et al., "Hardware/Software Architectures for Low-Power Embedded Multimedia Systems," Springer, 2011, pp. 1-240.
S.S.W.Liao, et al., "Post-Pass Binary Adaptation for Software-Based Speculative Precomputation," ACM Sigplan Notices, vol. 37, No. 5, Jun. 17-19, 2002, pp. 1-12.
W. Zhang, et al., "Accelerating and Adapting Precomputation Threads for Efficient Prefetching," High Performance Computer Architecture, IEEE 13th International Symposium on, Feb. 10, 2007, pp. 1-11.
X.H. Sun, et al., "Server-Based Data Push Architecture for Multi-Processor Environment," Journal of Computer Science and Technology, vol. 22 No. 5, Sep. 2007, pp. 1-12.

* cited by examiner

*Primary Examiner* — William B Partridge
(74) *Attorney, Agent, or Firm* — Cantor Colburn LLP

(57) ABSTRACT

Embodiments relate to pre-computation slice (p-slice) merging for prefetching in a computer processor. An aspect includes determining a plurality of p-slices corresponding to a delinquent instruction. Another aspect includes selecting a first p-slice and a second p-slice of the plurality of p-slices. Another aspect includes traversing the first p-slice and the second p-slice to determine that divergent instructions exist between the first p-slice and the second p-slice. Another aspect includes, based on determining that divergent instructions exist between the first p-slice and the second p-slice, determining whether the first p-slice and the second p-slice converge after the divergent instructions. Another aspect includes, based on determining that the first p-slice and the second p-slice converge after the divergent instructions, merging the first p-slice and the second p-slice into a single merged p-slice.

20 Claims, 5 Drawing Sheets

PRE-COMPUTATION SLICE MERGING FOR PREFETCHING IN A COMPUTER PROCESSOR

BACKGROUND

The present invention relates generally to prefetching in a computer processor, and more specifically, to pre-computation slice (p-slice) merging for prefetching in a computer processor.

During execution on a processor, an application may fetch data from a relatively large, slow main memory to a smaller, faster cache memory that is local to the processor in order to perform operations using the data. The time required to fetch the data (i.e., data access latency) may dominate the application execution time. Data prefetching uses a combination of hardware and/or software to hide this latency by predicting the data that an application will need and fetching the data ahead of time into the desired level of cache hierarchy. A prefetcher may track regular data access patterns (e.g., streaming, stride, or constant) that are observed during application execution, and prefetch future data references based on the prediction that a pattern will recur. However, a prefetcher may not be successful in tracking or prefetching for irregular data access patterns.

Speculative pre-computation slices, or p-slices, are used to perform prefetching for instructions having irregular data access patterns that may incur cache misses, also referred to as delinquent instructions. For a given delinquent instruction, a backward slice of instructions called a p-slice, made up of all instructions that directly or indirectly produce the source operands of the delinquent instruction, is extracted. By scheduling a p-slice as a concurrent software thread along with the main thread of the application, the data required by the main thread can be prefetched based on the execution of the p-slices. The pre-computation thread executing the p-slice must periodically check the main thread execution to guarantee that the p-slice is not out of sync with the main thread.

SUMMARY

Embodiments include a method, system, and computer program product for pre-computation slice (p-slice) merging for prefetching in a computer processor. An aspect includes determining a plurality of p-slices corresponding to a delinquent instruction. Another aspect includes selecting a first p-slice and a second p-slice of the plurality of p-slices. Another aspect includes traversing the first p-slice and the second p-slice to determine that divergent instructions exist between the first p-slice and the second p-slice. Another aspect includes, based on determining that divergent instructions exist between the first p-slice and the second p-slice, determining whether the first p-slice and the second p-slice converge after the divergent instructions. Another aspect includes, based on determining that the first p-slice and the second p-slice converge after the divergent instructions, merging the first p-slice and the second p-slice into a single merged p-slice.

BRIEF DESCRIPTION OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
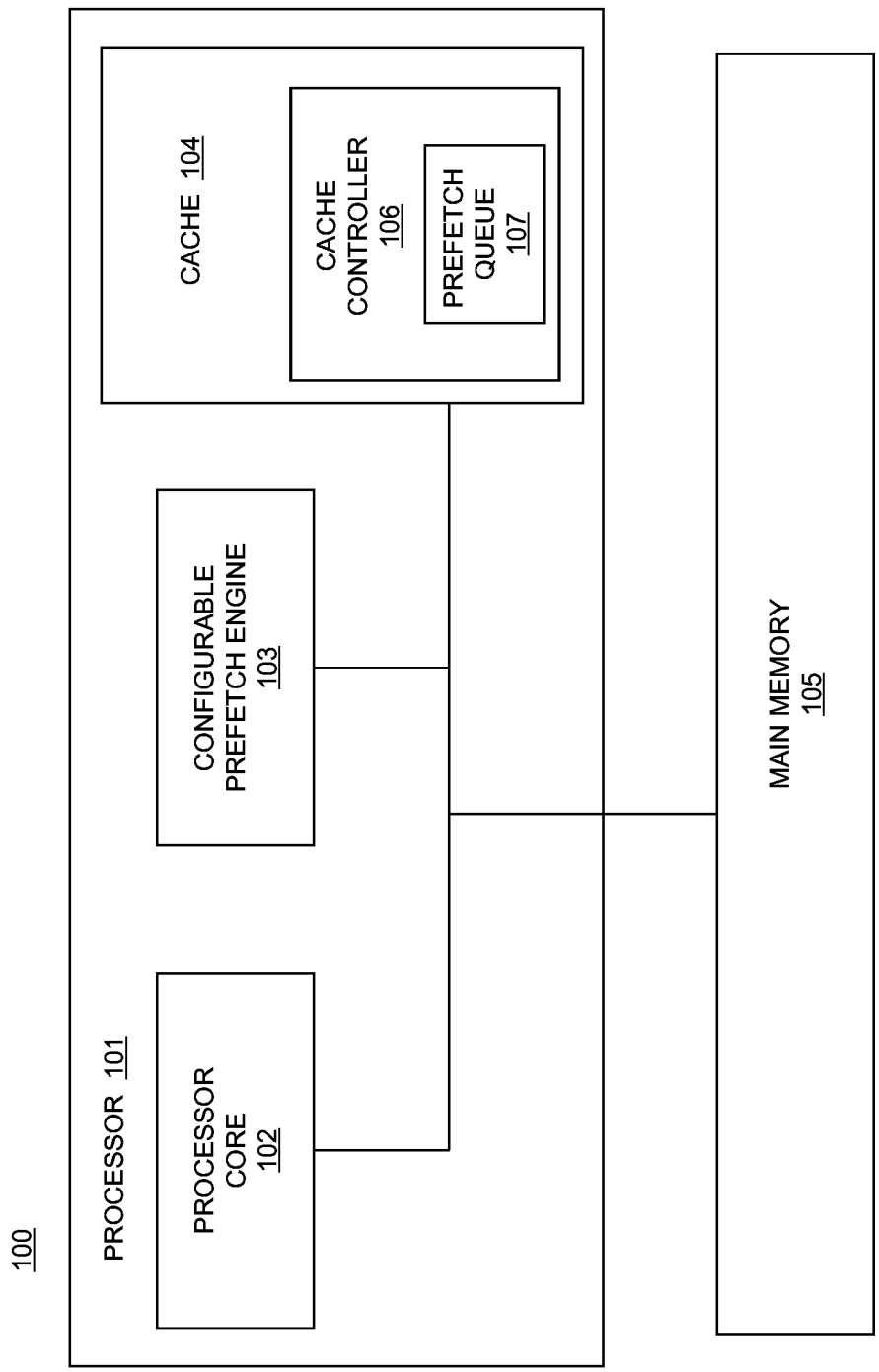
FIG. 1 depicts a computer system for pre-computation slice (p-slice) merging for prefetching in a computer processor in accordance with an embodiment.

Embodiments of p-slice merging for prefetching in a computer processor are provided, with exemplary embodiments being discussed below in detail. Configurable prefetch engine hardware that is local to the processor core may be used to monitor data access patterns and perform different types of prefetching based on the observed data access patterns, which may include execution of p-slices. The configurable prefetch engine hardware may include a plurality of prefetch modules, each of which may be configured to run a different type of prefetching, and the modules may be enabled or disabled based on the observed data access patterns in the processor workload.

The data access patterns within an application may change during different phases of execution of the application. For example, in one phase an application may exhibit a strided access pattern, and in the next phase may require the execution of a p-slice. The configurable prefetch engine enables monitoring application's data access behavior, and provides a plurality of on-demand prefetch modules to cater to varying demands from the application. Each prefetch module in the configurable prefetch engine may be dedicated to a different type of prefetching (e.g., stride, stream, constant, or a p-slice), and prefetch modules may be enabled or disabled during execution of an application based on the observed data access patterns. The configurable prefetch engine may be customized for each application that is executed by the processor. In a multithreaded processor, multiple prefetch modules may be enabled simultaneously.

Further, for a delinquent instruction that is repeated in, for example, a loop, there may be multiple p-slices corresponding to different instances of the same delinquent instruction. Unique signatures may be derived for each p-slice corresponding to the same delinquent instruction, and the signatures may be used to merge the multiple p-slices into a single merged p-slice. The merged p-slice for a given delinquent instruction includes all the key execution paths for the different dynamic instances of the delinquent instruction while still executing only a small fraction of the instructions executed by the main thread so as to be ahead of the main thread. The merging of the p-slices is performed based on the estimate of the cost of merging relative to the expected improvement in accuracy and coverage of prefetching using the merged p-slice.

To derive a p-slice for a delinquent instruction, the instruction trace (referred to as p-trace) between two dynamic instances of the delinquent instructions is determined. P-slice generation is performed by scanning the p-trace backwards starting with a later instance of the delinquent instruction, and extracting the dependency chain of instructions that produce the source operand(s) of the delinquent instruction up to an earlier instance of the delinquent instruction (i.e., the beginning of the p-trace). Instructions within the p-trace that are not part of the dependency chain for the delinquent instruction are not included in the p-slice. Unique p-slices in the set of p-slices for a particular instruction are identified by deriving a signature for each p-slice. To derive the signature, the control flow graph of a given p-slice is traversed, and the program counter (PC) of the starting instruction of each basic block within the flow graph is collected. The signature of a given p-slice includes, in some embodiments: the PC of the first instruction in the p-slice; the targets of all branches/jumps/calls in the p-slice; and, for conditional branches, if the branch was not taken, the PC of the following instruction. Each unique p-slice includes the frequency of occurrence of its signature in the execution trace. P-slices having duplicate signatures may be treated as a single p-slice.

Once the unique p-slices are identified, the unique p-slices are merged. Before merging is performed, the latency of execution of each unique p-slice may be estimated. If the execution latency estimate of a p-slice exceeds the estimate execution latency of an iteration of the main thread, such p-slices are deemed "long latency" p-slices. Long-latency p-slice execution time estimation includes the latency of the delinquent load instruction associated with the p-slice. If such a long-latency p-slice also includes a loop-carried dependency on the delinquent load, the p-slice cannot fetch the data ahead of time for the main thread. Therefore, such p-slices are eliminated from the merging process. Merging is then performed based on determining divergent instructions between pairs of p-slices within the set of unique p-slices based on the p-slice signatures. The resulting merged p-slice includes all execution paths that may lead to the delinquent instruction. In some embodiments, only p-slices that do not have any cycles (acyclic p-slices) are merged, focusing only on the inner-most loop.

FIG. 1 depicts a computer system 100 for p-slice merging for prefetching in a computer processor in accordance with an embodiment. Computer system 100 includes a processor 101 in communication with a main memory 105. Data is fetched from main memory 105 into cache memory 104 for use by the processor core 102 during execution of computer software. Configurable prefetch engine 103 prefetches data from main memory 105 into cache 104 so that the data is already in the cache 104 before it is needed by the one or more threads that are being executed by the processor core 102. Cache 104 includes a cache controller 106 that stores a prefetch queue 107 of pending prefetch requests that are received from the configurable prefetch engine 103. The prefetching may be performed based on monitoring of data access patterns of the workload of the processor core 102. Some example data access patterns that may be identified include stride, streaming, constant, or irregular (i.e., requiring a p-slice). For an irregular data access pattern, one or more p-slices are constructed and executed by the configurable prefetch engine 103. FIG. 1 is shown for illustrative purposes only; for example, a processor may include any appropriate number of processor cores, levels of cache, and configurable prefetch engines.

Figure 2:
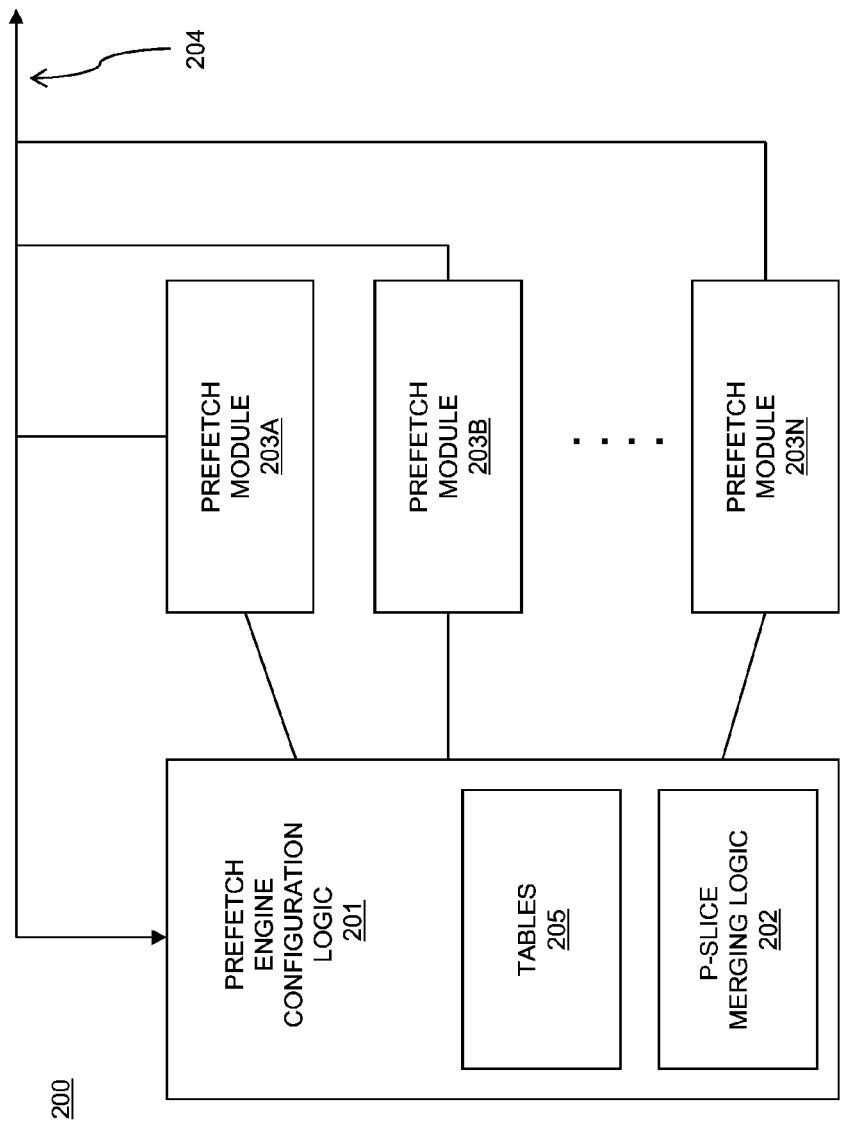
FIG. 2 depicts a configurable prefetch engine for p-slice merging for prefetching in a computer processor in accordance with an embodiment.

FIG. 2 depicts a configurable prefetch engine 200 for p-slice merging for prefetching in a computer processor in accordance with an embodiment. Configurable prefetch engine 200 corresponds to configurable prefetch engine 103 of FIG. 1, and is in communication with cache controller 106 in cache 104 via interface 204. The prefetch engine configuration logic 201 is in communication with a plurality of prefetch modules 203A-N, each of which may run a different prefetching method (e.g., stride, stream, constant, or a p-slice corresponding to a delinquent instruction). When a prefetch module of prefetch modules 203A-N is enabled, the prefetch module issues prefetch requests to the prefetch queue 107 in cache controller 106 via interface 204. The prefetch engine configuration logic configures the various prefetch modules 203A-N to run different the prefetching methods, which may include different p-slices, and may enable and disable the prefetch modules 203A-N based on data access patterns observed in the cache 104, which gives information about the workload in the processor.

Cache accesses, including data addresses and program counters of instructions requesting memory access, in cache 104 are monitored by the prefetch engine configuration logic 201 in configurable prefetch engine 200. The data addresses are monitored for stream or strided access patterns using tables 205, which may include stream and stride tables. A list of delinquent instruction addresses and pointers to their corresponding p-slices are maintained in the prefetch engine configuration logic 201. The instruction address of a memory access is compared with this list to determine if the memory access is a delinquent instruction. If a match occurs, the corresponding p-slice is loaded into a prefetch module of prefetch modules 203A-N to initiate prefetches by executing the p-slice. The prefetch engine configuration logic also receives information from the cache controller in cache 104 about whether the line was a prefetched line, and 2 bits indicating the prefetcher that initiated the prefetch for that line (stream, stride, or p-slice) along with a bit indicating whether the prefetch was useful. To enable getting this information, each cache line is augmented with log N bits (corresponding to the N prefetching modules), and 1 bit to indicate if the line was used before being replaced in the cache 104. This information is used to select a prefetch module of prefetch modules 203A-N to enable.

If the cache controller is busy handling requests from the processor, and cannot process the prefetch requests in the prefetch queue 107, the prefetch requests are dropped without being processed, and will have no impact on the correctness of the program execution. The configurable prefetch engine 200 generates prefetch addresses based on real (physical) addresses tracked in the stream/stride prefetch table 205. In the case of p-slice based prefetching the live-in values (i.e., register and/or memory contents) needed for the p-slice are acquired from the processor before launching a p-slice in a prefetch module of the configurable prefetch engine 200. The address translation for the prefetch addresses generated by the p-slice are either obtained from the processor, or determined using a copy of the memory management logic within the configurable prefetch engine. The prefetch addresses generated by the prefetch module of prefetch modules 203A-N that is running the p-slice are added to the prefetch queue 107 in the cache controller.

Figure 3:
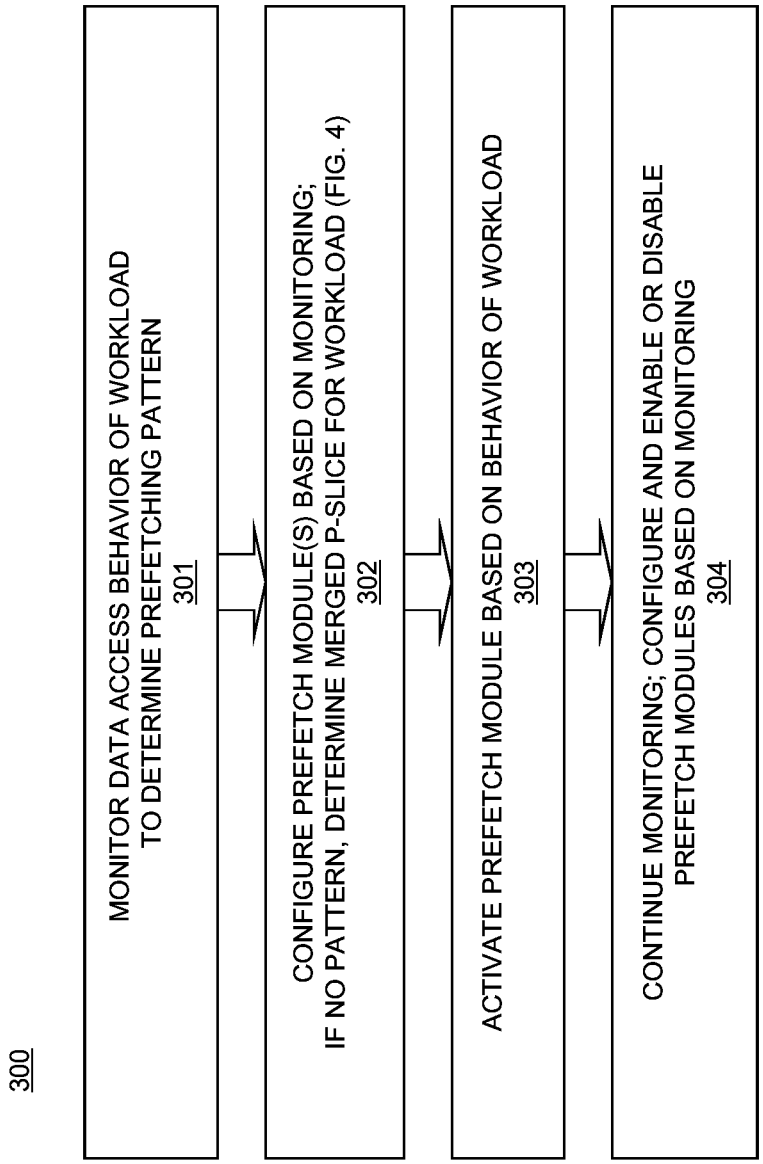
FIG. 3 depicts a process flow for implementing a configurable prefetch engine in accordance with an embodiment.

FIG. 3 depicts a method 300 for implementing a configurable prefetch engine in accordance with an embodiment. Method 300 may be implemented in configurable prefetch engine 103/200. In block 301, the prefetch engine configuration logic 201 monitors the behavior of the workload of the processor to determine an appropriate prefetching pattern. The monitoring may be performed based on monitoring of data access patterns in the cache 104. The data addresses of cache accesses in cache 104 are monitored for stream, constant, strided, or irregular access patterns. For irregular access patterns, a list of delinquent instruction addresses and pointers to the corresponding pre-computation slices are maintained in the prefetch engine configuration logic 201. The instruction address of a memory access is compared with this list to determine if the memory access is for a delinquent instruction. If a match occurs, the corresponding p-slice may be loaded into a prefetch module of prefetch modules 203A-N to initiate prefetches by executing of the p-slice. The prefetch engine configuration logic also receives information from the cache controller in cache 104 about whether the line was a prefetched line, and 2 bits indicating the prefetcher that initiated the prefetch for that line (stream, stride, or p-slice) along with a bit indicating whether the prefetch was useful. To enable getting this information, each cache line is augmented with log N bits (corresponding to the N prefetching modules), and 1 bit to indicate if the line was used before being replaced in the cache 104.

In block 302, the prefetch engine configuration logic 201 configures one or more prefetch modules of prefetch modules 203A-N based on the observed data access patterns. If an irregular access pattern has been observed, one or more p-slices are determined for the delinquent instruction corresponding to the irregular access pattern. If there is a plurality of p-slices for a single delinquent instruction, the plurality of p-slices may be merged into a single merged p-slice according to method 400 of FIG. 4, which is discussed below. In block 303, a prefetch module of prefetch modules 203A-N is activated based on the observed data access pattern, and the activated prefetch module issues prefetch requests to prefetch queue 107 in the cache controller 106. In some embodiments comprising a multithreaded processor, multiple prefetch modules may be enabled simultaneously, to perform prefetching for the different threads. In block 304, the configurable prefetch engine may continue to monitor the data access patterns in the cache 104, and configure, and enable or disable, the prefetch modules 203A-N based on the monitoring during continued execution of applications by the processor 101. The prefetch engine configuration logic 201 uses the monitoring to select among the prefetchers, and dynamically throttle or be more aggressive with certain prefetchers. The continued configuration of prefetch modules as performed in block 304 may include p-slice merging as discussed below with respect to FIG. 4.

Figure 4:
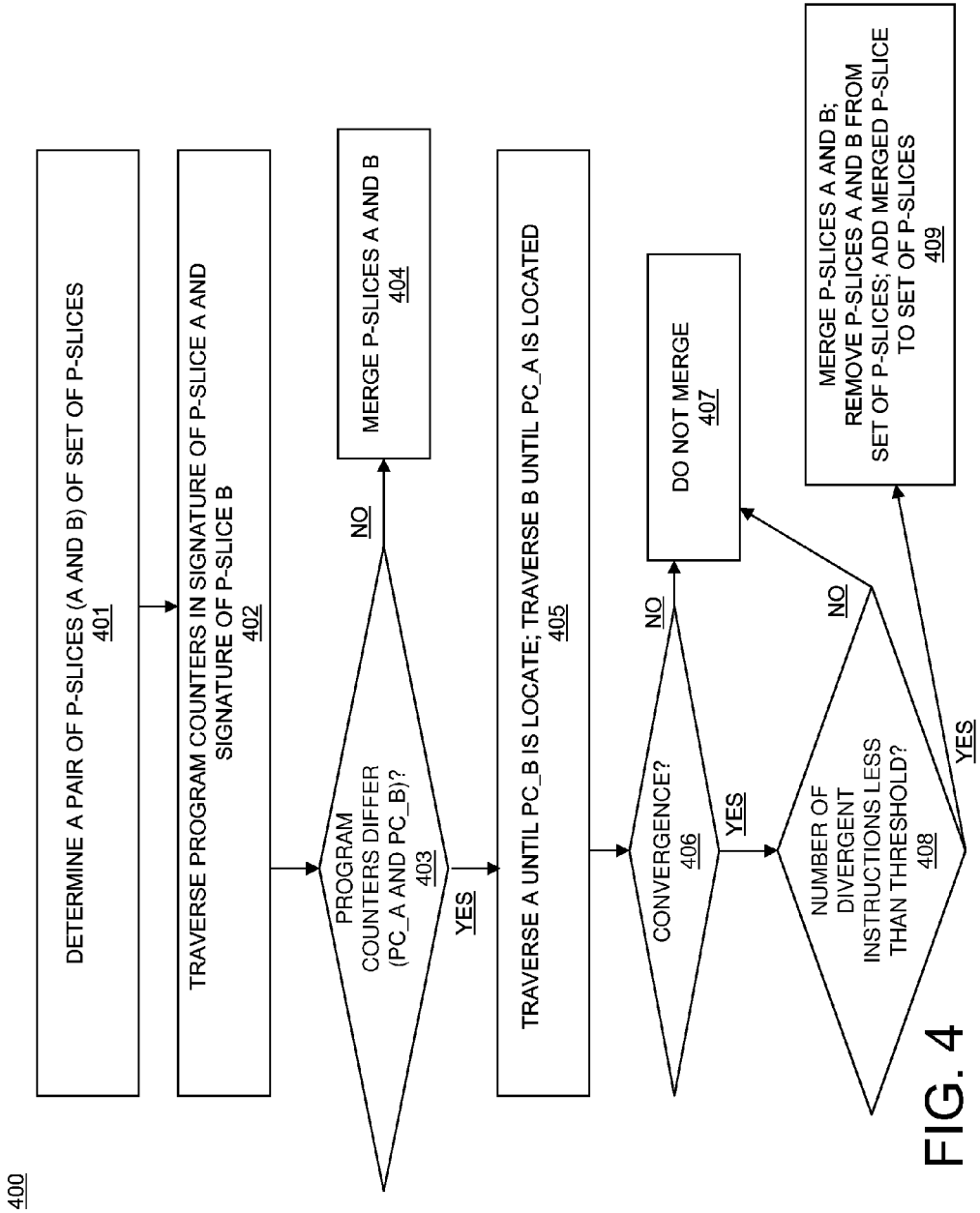
FIG. 4 depicts a process flow for p-slice merging for prefetching in a computer processor in accordance with an embodiment.

FIG. 4 depicts a method 400 for p-slice merging for prefetching in a computer processor in accordance with an embodiment. Method 400 may be performed in blocks 302 and 304 of FIG. 3 in some embodiments, or method 400 may be performed offline in a profiling run of the application, and the merged p-slice may be constructed in other embodiments. The merging of method 400 is performed based on a set of unique signatures, each signature corresponding to a p-slice of a set of p-slices corresponding to a single delinquent instruction. To derive a signature, the control flow graph of a given p-slice is traversed, and the program counter of the starting instruction of each basic block within the flow graph is collected. In some embodiments, the signature of a given p-slice includes: the PC of the first instruction in the p-slice; the targets of all branches/jumps/calls in the p-slice; and, for conditional branches, if the branch was not taken, the PC of the following instruction. By comparing the signatures of all p-slices for a given delinquent instruction, duplicates are eliminated and a set of unique p-slices is derived. Each unique p-slice includes the frequency of occurrence of its signature in the execution trace. In block 401 of method 400, a pair of p-slices of the set of unique p-slices is determined (for example, p-slice A and p-slice B). Then, in block 402, the program counters in the signature of p-slice A and the signature of p-slice B are traversed. All instructions that are common to both p-slice A and p-slice B are included in the merged p-slice.

In block 403, it is determined based on the traversal whether a program counter in the signature of p-slice A differs from a program counter in the signature of p-slice B. If it is determined in block 403 that no program counter in the signature of p-slice A differs from a program counter in the signature of p-slice B based on the traversal, the p-slices A and B are merged in block 404, and method 400 ends. If it is determined in block 403 that a program counter in the signature of p-slice A (PC_A) differs from a program counter in the signature of p-slice B (PC_B) based on the traversal, flow proceeds from block 403 to block 405 of FIG. 4. In block 405, the signature of p-slice B is traversed until PC_A is located, and the signature of p-slice A is traversed until PC_B is located. If PC_A is not found in p-slice B, or PC_B is not found in p-slice A, then it is determined in block 406 that there is no convergence between p-slice A and p-slice B, and flow proceeds to block 407, in which p-slice A and p-slice B are not merged. If PC_A is found in p-slice B, and PC_B is found in p-slice A, then it is determined in block 406 that there is convergence, and flow proceeds to block 408. In block 408, it is determined whether the number of divergent instructions (i.e., instructions that are in p-slice A but not in p-slice B, and instructions that are in p-slice B but not in p-slice A) is less than a threshold. If it is determined in block 408 that the number of divergent instructions is not less than the threshold, flow proceeds to block 407, and p-slice A and p-slice B are not merged. If it is determined in block 408 that the number of divergent instructions is less than the threshold, flow proceeds to block 407, and p-slice A and p-slice B are merged. The merged p-slice contains all of the divergent instructions. P-slices A and B are removed from the set of unique p-slices corresponding to the delinquent instruction, and the merged p-slice is added. Method 400 is repeated for all pairs of p-slices in the set of unique p-slices corresponding to the delinquent instruction.

If method 400 results in a single merged p-slice for the delinquent instruction, the merged p-slice is loaded onto a prefetch module of prefetch modules 203A-N, and may be enabled for prefetching for the delinquent instruction. If method 400 results in more than one p-slice (i.e., more than one p-slice has the same frequency of occurrence), the p-slice with the smaller execution latency estimate may be selected for running on the prefetch module. An example of a pseudocode embodiment of p-slice merging, as is performed in method 400 of FIG. 4, is illustrated below with respect to Table 1.

TABLE 1 example p-slice merging pseudocode

Input : p-slices for a given delinquent instruction along with a signature
per p-slice (i.e.,beginning address of all the basic blocks in the p-slice)
1. Remove all p-slices with cycles (Any basic block that repeats creates
   a cycle in the p-slice)
   a. Hash basic blocks in each p-slice, and any hash collision is a cycle.
2. Mark each basic block in all p-slices with a unique identifier.
   a. Traverse each p-slice and associate a monotonically increasing ID
   for each (new) unique basic block
   b. The dimensionality of the signature vector of each p-slice is
   the same as the number of unique basic block identifiers (=m)

TABLE 1-continued example p-slice merging pseudocode

```
    c. For each unique basic block also count the number of
       instructions per basic block and associate it with the basic block
       identifier (= length[m])
 3. After steps 1 & 2, there are n unique p-slices each with a signature
    vector of dimension m. (i.e., n x m p-vectors).
 4. Remove duplicate p-slices (i.e., p-slices with the same signature):
    Duplicate[n] = {0}; Strength[n] = 0; // strength[i] : number of dupli-
    cates
    for p-vector[i]; for (i = 1 to n) {
        if Duplicate[i] is 0{
            for (j = i+1 to n) {
                if Duplicate[j] is 0 {
                    if ((p-vector[i] XOR p-vector[j]) == 0) {
                        (Strength[i])++;
                        Duplicate[j] = 1;
                    }
                }
            }
        }
    }
```

5. for each Duplicate[i]==0, the Strength[i] indicates the number of duplicate p-vectors for this unique p-vector. Duplicate[i]==1 indicates that this p-vector is not considered further because it is a duplicate.
6. Sort the Strength[n] and Duplicate[n] in descending order of Strength. (If there are k unique p-vectors, we have a sorted order of these k-vectors based on the strength (i.e., how many p-slices were duplicates of this p-slice). (Assume these k sorted vectors and their corresponding strengths were copied to sortedPvector[k] and sortedStrength[k]).
7. Merge p-slices:

```
for (i=1 to k) {
    for (j=i+1 to k) {
        for(bit=0; bit<m; bit++) {
            overhead(i,j)+=(sortedPvector[i][m] XOR sortedPvec-
                tor[j][m])*length[m]
        }
        if (overhead(i,j)<minoverhead) {
            minoverhead=(i,j)'s overhead}
        }
        if(minoverhead(i,j)<threshold to merge) {/* threshold to
            merge is defined as the maximum number of instruc-
            tions that can be predicated */create a merged p-vector
            by ORing the minoverhead (i,j) vectors; strength of
            merged vector=sum (sortedStrength[i], sortedStrength
            [j]); add new merged p-vector to the future list of to be
            merged p-vectors; remove sortedPvector[i] and sorted-
            Pvector[j] from the current list of vectors to be merged.
        }
        else {
            add sortedPvector[i] and sortedPvector[j] from the cur-
                rent list of vectors to the future list of to be merged
                p-vectors
        }
    }
}
```

8. If the future list of to be merged p-vectors is not NULL, and no p-vector in the list has code coverage>threshold, return to step 6 with this new list of sorted vectors based on their strength. Code coverage threshold is defined as the acceptable number of instructions in the p-slice to cover majority of the code paths.
9. Use the p-vector with the maximum code coverage, and construct the p-slice out of this based on breadth-first traversal of the CFG for the basic blocks in the p-vector.

Figure 5:
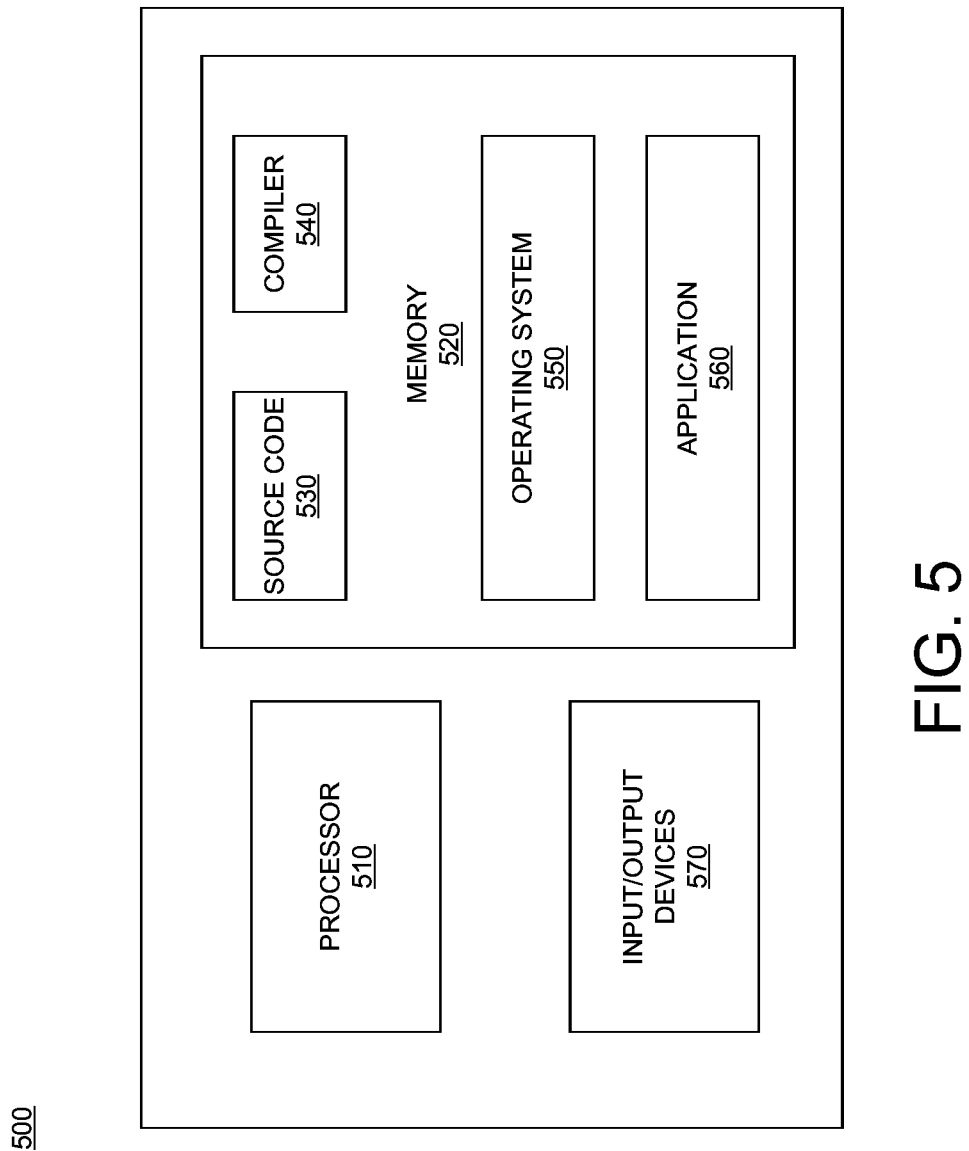
FIG. 5 depicts an example of a computer for use in conjunction with embodiments of p-slice merging for prefetching in a computer processor.

FIG. 5 depicts an example of a computer for use in conjunction with embodiments of p-slice merging for prefetching in a computer processor. Various operations discussed above may utilize the capabilities of the computer 500. One or more of the capabilities of the computer 500 may be incorporated in any element, module, application, and/or component discussed herein. For example, embodiments of p-slice merging for prefetching in a computer processor may be incorporated into processor 510.

The computer 500 includes, but is not limited to, PCs, workstations, laptops, PDAs, palm devices, servers, storages, and the like. Generally, in terms of hardware architecture, the computer 500 may include one or more processors 510, memory 520, and one or more I/O devices 570 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 510 is a hardware device for executing software that can be stored in the memory 520. The processor 510 can be virtually any custom made or commercially available processor, a central processing unit (CPU), a digital signal processor (DSP), or an auxiliary processor among several processors associated with the computer 500, and the processor 510 may be a semiconductor based microprocessor (in the form of a microchip) or a macroprocessor.

The memory 520 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 520 may incorporate electronic, magnetic, optical, and/or other types of storage media. Note that the memory 520 can have a distributed architecture, where various components are situated remote from one another, but can be accessed by the processor 510.

The software in the memory 520 may include one or more separate programs, each of which comprises an ordered listing of executable instructions for implementing logical functions. The software in the memory 520 includes a suitable operating system (O/S) 550, compiler 540, source code 530, and one or more applications 560 in accordance with exemplary embodiments. As illustrated, the application 560 comprises numerous functional components for implementing the features and operations of the exemplary embodiments. The application 560 of the computer 500 may represent various applications, computational units, logic, functional units, processes, operations, virtual entities, and/or modules in accordance with exemplary embodiments, but the application 560 is not meant to be a limitation.

The operating system 550 controls the execution of other computer programs, and provides scheduling, input-output control, file and data management, memory management, and communication control and related services. It is contemplated by the inventors that the application 560 for implementing exemplary embodiments may be applicable on all commercially available operating systems.

Application 560 may be a source program, executable program (object code), script, or any other entity comprising a set of instructions to be performed. When a source program, then the program is usually translated via a compiler (such as the compiler 540), assembler, interpreter, or the like, which may or may not be included within the memory 520, so as to operate properly in connection with the O/S 550. Furthermore, the application 560 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, FORTRAN, COBOL, Perl, Java, ADA, .NET, and the like.

The I/O devices 570 may include input devices such as, for example but not limited to, a mouse, keyboard, scanner, microphone, camera, etc. Furthermore, the I/O devices 570 may also include output devices, for example but not limited to a printer, display, etc. Finally, the I/O devices 570 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 570 also include components for communicating over various networks, such as the Internet or intranet.

If the computer 500 is a PC, workstation, intelligent device or the like, the software in the memory 520 may further include a basic input output system (BIOS) (omitted for simplicity). The BIOS is a set of essential software routines that initialize and test hardware at startup, start the O/S 550, and support the transfer of data among the hardware devices. The BIOS is stored in some type of read-only-memory, such as ROM, PROM, EPROM, EEPROM or the like, so that the BIOS can be executed when the computer 500 is activated.

When the computer 500 is in operation, the processor 510 is configured to execute software stored within the memory 520, to communicate data to and from the memory 520, and to generally control operations of the computer 500 pursuant to the software. The application 560 and the O/S 550 are read, in whole or in part, by the processor 510, perhaps buffered within the processor 510, and then executed.

When the application 560 is implemented in software it should be noted that the application 560 can be stored on virtually any computer readable storage medium for use by or in connection with any computer related system or method. In the context of this document, a computer readable storage medium may be an electronic, magnetic, optical, or other physical device or means that can contain or store a computer program for use by or in connection with a computer related system or method.

The application 560 can be embodied in any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any means that can store the program for use by or in connection with the instruction execution system, apparatus, or device. The computer readable storage medium can be, for example but not limited to, an electronic, magnetic, optical, electromagnetic, or semiconductor system, apparatus, or a device.

More specific examples (a nonexhaustive list) of the computer-readable storage medium may include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable storage medium could even be paper or another suitable medium, upon which the program is printed or punched, as the program can be electronically captured, via for instance optical scanning of the paper or other medium, then compiled, interpreted or otherwise processed in a suitable manner if necessary, and then stored in a computer memory.

In exemplary embodiments, where the application 560 is implemented in hardware, the application 560 can be implemented with any one or a combination of the following technologies, which are well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Technical effects and benefits include reduced cache miss penalties in a computer processor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A nonexhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for pre-computation slice (p-slice) merging for prefetching in a computer processor, the method comprising:
    determining a plurality of p-slices corresponding to a delinquent instruction;
    selecting a first p-slice and a second p-slice of the plurality of p-slices;
    traversing the first p-slice and the second p-slice to determine that divergent instructions exist between the first p-slice and the second p-slice;
    based on determining that divergent instructions exist between the first p-slice and the second p-slice, determining whether the first p-slice and the second p-slice converge after the divergent instructions; and
    based on determining that the first p-slice and the second p-slice converge after the divergent instructions, merging the first p-slice and the second p-slice into a single merged p-slice.

2. The method of claim 1, further comprising, before merging the first p-slice and the second p-slice:
    determining whether a number of the divergent instructions is greater than a threshold;
    based on the number of the divergent instructions being greater than the threshold, not merging the first p-slice and the second p-slice; and
    based on the number of the divergent instructions not being greater than the threshold, merging the first p-slice and the second p-slice.

3. The method of claim 1, further comprising determining a signature for each of the plurality of p-slices, wherein the signature of a given p-slice comprises:
    a program counter of a first instruction in the given p-slice;

targets of any branches, jumps, or calls in the given p-slice; and, for a conditional branch, if the conditional branch is not taken, a program counter of a following instruction of the conditional branch.

4. The method of claim 3, further comprising determining a set of unique p-slices for the delinquent instruction based on the determined signatures.

5. The method of claim 3, wherein determining whether the first p-slice and the second p-slice converge after the divergent instructions comprises:

determining a first program counter in the first p-slice that does not match a second program counter in the second p-slice based on traversal of the signature of the first p-slice and the second p-slice;

continuing traversal of the signature of the first p-slice to determine whether the second program counter exists in the first p-slice;

continuing traversal of the signature of the second p-slice to determine whether the first program counter exists in the second p-slice;

based on determining that the second program counter exists in the first p-slice and the first program counter exists in the second p-slice, determining that the first p-slice and the second p-slice converge.

6. The method of claim 1, further comprising executing the merged p-slice in a prefetch module of a configurable prefetching engine, the configurable prefetch engine comprising:

a prefetch configuration logic; and a plurality of prefetch modules, each of the prefetch modules comprising distinct hardware modules, wherein the prefetch configuration logic is configured to enable and disable the plurality of prefetch modules based on data access patterns in a cache of the computer processor.

7. The method of claim 6, wherein the plurality of prefetch modules each run a different prefetching method comprising one of strided, constant, stream, and a p-slice.

8. A computer program product for implementing pre-computation slice (p-slice) merging for prefetching in a computer processor, the computer program product comprising:

a computer readable non-transitory medium having program instructions embodied therewith, the program instructions readable by a processing circuit to cause the processing circuit to perform a method comprising:

determining a plurality of p-slices corresponding to a delinquent instruction;

selecting a first p-slice and a second p-slice of the plurality of p-slices;

traversing the first p-slice and the second p-slice to determine that divergent instructions exist between the first p-slice and the second p-slice;

based on determining that divergent instructions exist between the first p-slice and the second p-slice, determining whether the first p-slice and the second p-slice converge after the divergent instructions; and based on determining that the first p-slice and the second p-slice converge after the divergent instructions, merging the first p-slice and the second p-slice into a single merged p-slice.

9. The computer program product of claim 8, the method further comprising, before merging the first p-slice and the second p-slice:

determining whether a number of the divergent instructions is greater than a threshold;

based on the number of the divergent instructions being greater than the threshold, not merging the first p-slice and the second p-slice; and based on the number of the divergent instructions not being greater than the threshold, merging the first p-slice and the second p-slice.

10. The computer program product of claim 8, the method further comprising determining a signature for each of the plurality of p-slices, wherein the signature of a given p-slice comprises:

a program counter of a first instruction in the given p-slice;

targets of any branches, jumps, or calls in the given p-slice; and, for a conditional branch, if the conditional branch is not taken, a program counter of a following instruction of the conditional branch.

11. The computer program product of claim 10, the method further comprising determining a set of unique p-slices for the delinquent instruction based on the determined signatures.

12. The computer program product of claim 10, wherein determining whether the first p-slice and the second p-slice converge after the divergent instructions comprises:

determining a first program counter in the first p-slice that does not match a second program counter in the second p-slice based on traversal of the signature of the first p-slice and the second p-slice;

continuing traversal of the signature of the first p-slice to determine whether the second program counter exists in the first p-slice;

continuing traversal of the signature of the second p-slice to determine whether the first program counter exists in the second p-slice;

based on determining that the second program counter exists in the first p-slice and the first program counter exists in the second p-slice, determining that the first p-slice and the second p-slice converge.

13. The computer program product of claim 8, the method further comprising executing the merged p-slice in a prefetch module of a configurable prefetching engine, the configurable prefetch engine comprising:

a prefetch configuration logic; and a plurality of prefetch modules, each of the prefetch modules comprising distinct hardware modules, wherein the prefetch configuration logic is configured to enable and disable the plurality of prefetch modules based on data access patterns in a cache of the computer processor.

14. The computer program product of claim 13, wherein the plurality of prefetch modules each run a different prefetching method comprising one of strided, constant, stream, and a p-slice.

15. A computer system for pre-computation slice (p-slice) merging for prefetching in a computer processor, the system comprising:

a memory; and the computer processor communicatively coupled to said memory, the computer system configured to perform a method comprising:

determining a plurality of p-slices corresponding to a delinquent instruction;

selecting a first p-slice and a second p-slice of the plurality of p-slices;

traversing the first p-slice and the second p-slice to determine that divergent instructions exist between the first p-slice and the second p-slice;

based on determining that divergent instructions exist between the first p-slice and the second p-slice, determining whether the first p-slice and the second p-slice converge after the divergent instructions; and based on determining that the first p-slice and the second p-slice converge after the divergent instructions, merging the first p-slice and the second p-slice into a single merged p-slice.

16. The system of claim 15, the method further comprising, before merging the first p-slice and the second p-slice:

determining whether a number of the divergent instructions is greater than a threshold;

based on the number of the divergent instructions being greater than the threshold, not merging the first p-slice and the second p-slice; and based on the number of the divergent instructions not being greater than the threshold, merging the first p-slice and the second p-slice.

17. The system of claim 15, the method further comprising determining a signature for each of the plurality of p-slices, wherein the signature of a given p-slice comprises:

a program counter of a first instruction in the given p-slice;

targets of any branches, jumps, or calls in the given p-slice; and, for a conditional branch, if the conditional branch is not taken, a program counter of a following instruction of the conditional branch.

18. The system of claim 17, the method further comprising determining a set of unique p-slices for the delinquent instruction based on the determined signatures.

19. The system of claim 17, wherein determining whether the first p-slice and the second p-slice converge after the divergent instructions comprises:

determining a first program counter in the first p-slice that does not match a second program counter in the second p-slice based on traversal of the signature of the first p-slice and the second p-slice;

continuing traversal of the signature of the first p-slice to determine whether the second program counter exists in the first p-slice;

continuing traversal of the signature of the second p-slice to determine whether the first program counter exists in the second p-slice;

based on determining that the second program counter exists in the first p-slice and the first program counter exists in the second p-slice, determining that the first p-slice and the second p-slice converge.

20. The system of claim 15, the method further comprising executing the merged p-slice in a prefetch module of a configurable prefetching engine, the configurable prefetch engine comprising:

a prefetch configuration logic; and a plurality of prefetch modules, each of the prefetch modules comprising distinct hardware modules, wherein the prefetch configuration logic is configured to enable and disable the plurality of prefetch modules based on data access patterns in a cache of the computer processor.

* * * * *